No. 740,574. PATENTED OCT. 6, 1903.
A. H. KOHLMEYER.
FILTER.
APPLICATION FILED NOV. 24, 1902.
NO MODEL. 2 SHEETS—SHEET 1.

Attest:
Edw. L. Dillon
H. Hopkins

Inventor:
August H. Kohlmeyer
by Carr & Carr
Att'ys.

No. 740,574. PATENTED OCT. 6, 1903.
A. H. KOHLMEYER.
FILTER.
APPLICATION FILED NOV. 24, 1902.
NO MODEL. 2 SHEETS—SHEET 2.

Attest:
Edw. J. Dillon
H. Hopkins

Inventor:
August H. Kohlmeyer
by Carnet Carr
Att'ys

No. 740,574.

Patented October 6, 1903.

UNITED STATES PATENT OFFICE.

AUGUST H. KOHLMEYER, OF ST. LOUIS, MISSOURI.

FILTER.

SPECIFICATION forming part of Letters Patent No. 740,574, dated October 6, 1903.

Application filed November 24, 1902. Serial No. 132,542. (No model.)

*To all whom it may concern:*

Be it known that I, AUGUST H. KOHLMEYER, a citizen of the United States, and a resident of the city of St. Louis, State of Missouri, have invented a new and useful Improvement in Filters, of which the following is a specification.

My invention relates to filters, and has for its principal objects to provide for the uniform abrasion of the filter-stones, to provide for the use of filter-stones of different diameters, to provide for the adjustment of the abrasion blocks or strips, to improve the mounting of such abrasion-blocks, and generally to improve the construction and operation of the filter.

My invention consists in the arrangements and combinations of parts hereinafter described and claimed.

Figure 1:
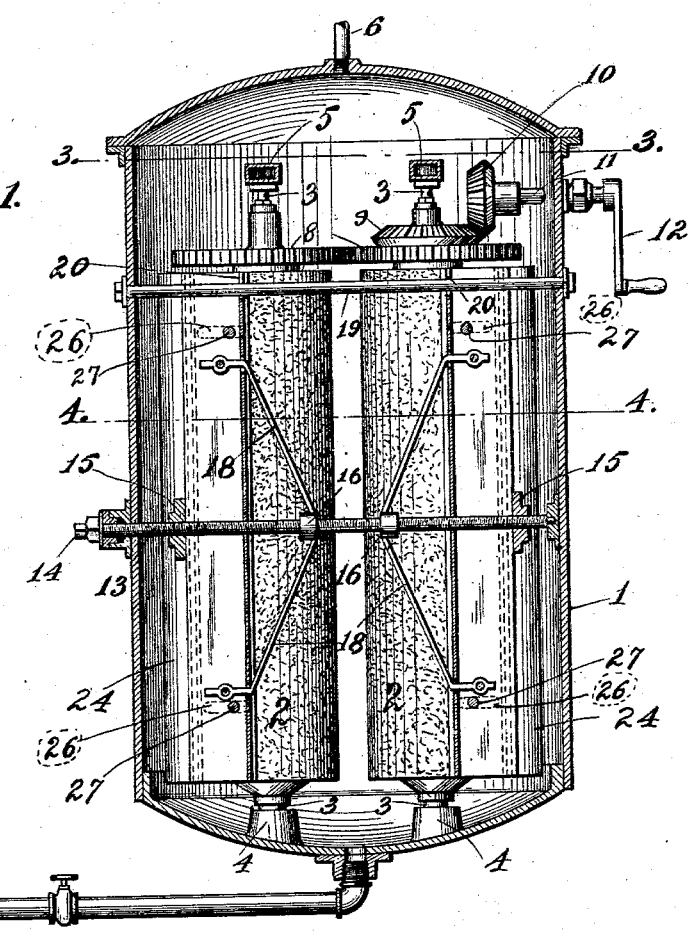
Figure 2:
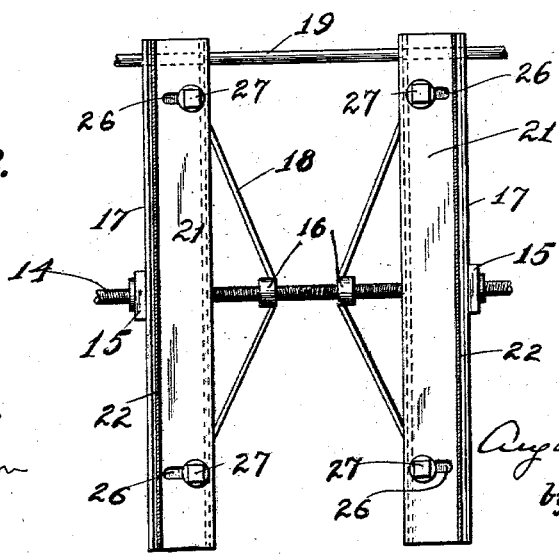
Figure 3:
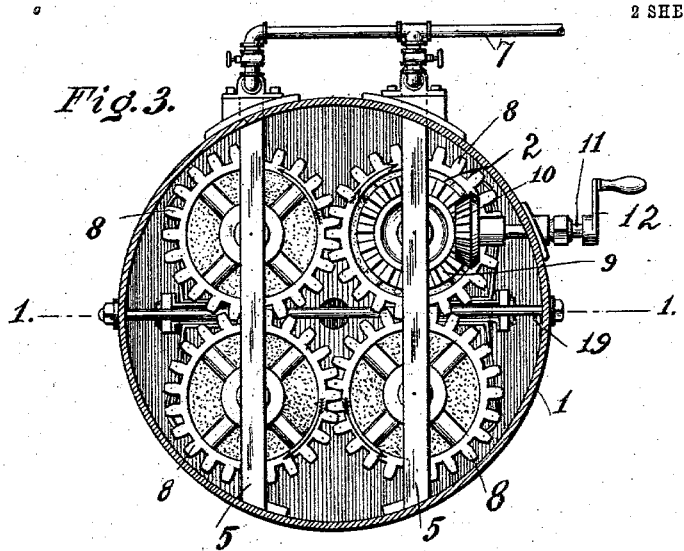
Figure 4:
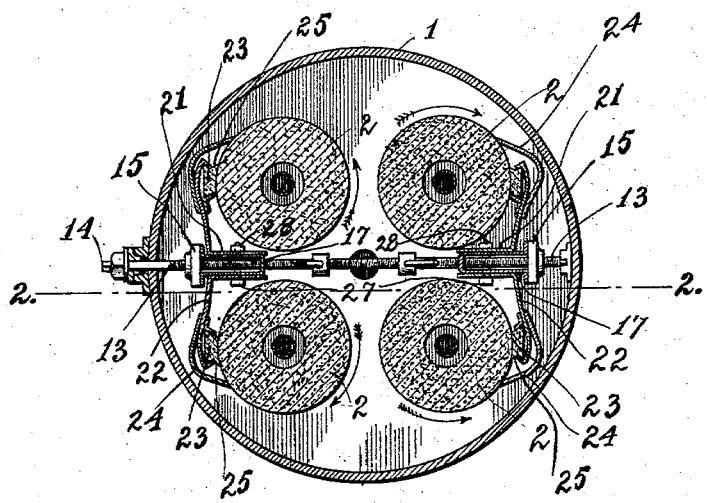

In the accompanying drawings, which form part of this specification, and wherein like symbols refer to like parts wherever they occur, Figure 1 is a vertical sectional view on the plane indicated by the line 1 1 of Fig. 3. Fig. 2 is a vertical sectional view of the scraper mechanism on the line 2 2 of Fig. 4. Fig. 3 is a plan view of my filter with the cap-plate removed, as indicated by the line 3 3 of Fig. 1. Fig. 4 is a horizontal section of my filter on the plane of the line 4 4 of Fig. 1.

My filter comprises a tank 1, provided with hollow cylindrical filter-stones 2, rotatively mounted in any suitable manner. Preferably the filter-stones are arranged vertically in one or more pairs, each stone consisting of one or more sections secured together and provided axially at the end with projecting spindles 3. The lower spindles turn in a step 4, provided therefor on the bottom of the tank, and the upper spindle projects through openings in a cross-piece 5, provided therefor in the upper portion of the filter. The supply-pipe 6 opens into the body of the tank, and the outlet-pipe 7 communicates with perforated pipes arranged in the hollow interiors of the respective stones, and the inlet and outlet pipe connections are arranged in accordance with common practice.

The shafts or spindles which support the respective filter-stones have each a gear-wheel 8 mounted thereon and arranged to intermesh with one another, so as to constitute a train of gears. The upper shaft or spindle of one of the stones has a beveled gear 9 mounted thereon, with which meshes a beveled gear 10, fixed upon a suitably-mounted shaft 11, which projects through the filter-tank and is provided at the outside thereof with a hand-crank 12. By this arrangement the motion effected by means of the hand-crank is transmitted to all of the filter-stones.

A second shaft 13 is mounted horizontally inside of the filter-tank, and one end thereof projects therethrough and is provided with a hand-crank or with a head 14, adapted for a hand-crank to fit upon. This shaft has its respective end portions threaded in opposite directions, and upon each of said threaded portions are mounted two nuts 15 16, arranged in pairs. The outermost nut 15 of each pair has a vertically-elongated U-shaped frame 17 fixed thereto. The innermost nut 16 of each pair is connected, by means of metal strips or braces 18, to the upper and lower end portions of said U-shaped frame 17. Near the upper end of the U-shaped frame is fixed a rod 19, which extends horizontally across the tank through a groove or opening 20 in said frame, and thereby constitutes a guide for preventing the rotary movement thereof.

The sides of the U-shaped frame constitute an abutment or bearing-surface for the bases 21 of the arms 22, which support the abrasion material 23. For this purpose each of the supporting-arms 22 and its corresponding base are made of a single piece of sheet metal, wherein the base portion 21 fits flatwise against the U-shaped frame and the arm portion 22 is bent outwardly therefrom at an angle. This arm portion 22 is stiffly resilient and is arranged and shaped to hold blocks or strips 23 of abrasion material, such as emery, sandstone, or the like. When desired, a scraper 24 may be mounted upon the back of said arm, said scraper consisting of a sheet of metal bent to extend around the end of the arm and bear upon the filter-stone in advance of the abrasion material. Preferably, however, the strips or blocks of abrasion material are each formed with the advanced or outermost face beveled forwardly at a sharp angle, as shown at 25, so as to constitute a scraper for clearing the stone of mud.

In order to adjust the supports for the abrasion-blocks lengthwise of the shaft, horizontally-elongated slots 26 are formed in the base portion of said supports near the respective ends thereof, and the bolts 27, which clamp such supports to the U-shaped frame, extend through such elongated slots and are clamped by means of nuts 28. In order to adjust the supports, therefore, it is only necessary to loosen the nuts 28 and move the support inwardly or outwardly, as desired, and then tighten the nuts to secure the support in its newly-adjusted position.

It is noted that each of the abrasion-block supports is separately adjustable, in consequence of which each filter-stone is independent of the other stones and its size and abrasion are in no way dependent upon the size of the other filter-stones. A stone which has been reduced in diameter by abrasion may therefore be used in connection with a new stone, so that the breakage of any one stone does not impair the value of the others. It is also noted that the turning of the adjusting-shaft adjusts all of the abrasion-blocks simultaneously, and in case one stone wears faster than another the pressure is maintained on the harder stone after it has been relieved from the softer stone, so that the diameter of each of the stones is decreased with a tolerable degree of uniformity. So, too, the strips or braces prevent the canting or tilting of the U-shaped frame from its proper vertical position, and consequently if the upper end portion or section of the filter-stone is harder or softer than the lower portion or section thereof the harder section will be worn down evenly with the softer section.

Obviously the construction hereinbefore described is capable of considerable modification without departing from my invention, and I do not wish to be restricted to the exact construction hereinbefore described.

What I claim is—

1. A filter comprising filter-stones and means for rotating the same, a threaded shaft arranged transversely of said stones, supports for abrasion material working on said shaft, and abrasion material arranged on said supports to bear against said stones.

2. A filter comprising a tank, filter-stones therein and means for rotating the same, abrasion material for the respective stones, independently-adjustable supports for such abrasion material, and a threaded shaft upon which said supports work, said shaft having an end projecting through said tank to provide for the turning thereof, substantially as described.

3. A filter comprising filter-stones and means for rotating the same, abrasion-blocks arranged to bear against said stones respectively and having their advanced edges beveled to constitute mud-scrapers, and supports for said abrasion-blocks, and a threaded shaft upon which said support works.

4. A filter comprising a tank, two pairs of filter-stones rotatably mounted therein, a shaft arranged transversely of said stones and between the stones of each pair and having its end portions threaded in opposite directions, supports for abrasion material threaded to work on said shaft, and abrasion material arranged on said supports to bear against the respective stones, and means for manipulating said transverse shaft.

5. A filter comprising a tank, filter-stones rotatably mounted therein, a threaded shaft arranged between and transversely of said stones, a U-shaped frame threaded to work on said shaft, and stiffly-resilient angle-plates fastened flatwise to said frame and arranged to support abrasion material, and means for manipulating said shaft to force said abrasion material against the respective stones.

6. A filter comprising a tank, filter-stones rotatably mounted therein, a threaded shaft arranged between and transversely of said stones, a U-shaped frame threaded to work on said shaft, and stiffly-resilient angle-plates adjustably fastened flatwise to said frame and arranged to support abrasion material, and means for manipulating said shaft to force said abrasion material against the respective stones.

7. A filter comprising a tank, filter-stones rotatably mounted therein, a threaded shaft arranged between and transversely of said stones, a U-shaped frame threaded to work on said shaft, a nut likewise threaded to work on said shaft and brace-pieces connecting said nut to the ends of said frame, stiffly-resilient angle-plates fastened flatwise to said frame and arranged to support abrasion material, and means for manipulating said shaft to force said abrasion material against the respective stones.

8. A filter comprising a tank, filter-stones rotatably mounted therein, a threaded shaft arranged between and transversely of said stones, a U-shaped frame threaded to work on said shaft, and stiffly-resilient angle-plates fastened flatwise to said frame and arranged to support abrasion material, a guide for such frame arranged transversely of said stones near one end of said frame, and means for manipulating said shaft to force said abrasion material against the respective stones.

9. A filter comprising a tank, filter-stones rotatably mounted therein, a threaded shaft arranged between and transversely of said stones, a U-shaped frame threaded to work on said shaft, and stiffly-resilient angle-plates fastened flatwise to said frame and arranged to support abrasion material and each angle-plate having a scraper arranged to bear against a corresponding stone in advance of the abrasion material, and means for manipulating said shaft to force said abrasion material and scrapers against the respective stones.

AUGUST H. KOHLMEYER.

Witnesses:
CARL J. DAUDT,
WM. P. CARR.